(12) United States Patent
Kim et al.

(10) Patent No.: US 8,115,711 B2
(45) Date of Patent: *Feb. 14, 2012

(54) APPARATUS AND METHOD FOR PERFORMING A MIRROR FUNCTION IN A PORTABLE TERMINAL

(75) Inventors: Jong-Myung Kim, Kumi (KR); Jae-Ik Jung, Taegu-Kwangyokshi (KR)

(73) Assignee: Samsung Electronics Co., Ltd. (KR)

( * ) Notice: Subject to any disclaimer, the term of this patent is extended or adjusted under 35 U.S.C. 154(b) by 804 days.

This patent is subject to a terminal disclaimer.

(21) Appl. No.: 11/506,124

(22) Filed: Aug. 17, 2006

(65) Prior Publication Data

US 2006/0274018 A1 Dec. 7, 2006

Related U.S. Application Data

(63) Continuation of application No. 10/144,336, filed on May 13, 2002, now Pat. No. 7,151,515.

(30) Foreign Application Priority Data

May 12, 2001 (KR) .................................. 2001-26031

(51) Int. Cl.
*G09G 3/36* (2006.01)
(52) U.S. Cl. .......................................... 345/87; 345/104
(58) Field of Classification Search ................... 345/87, 345/204
See application file for complete search history.

(56) References Cited

U.S. PATENT DOCUMENTS

| 4,202,607 | A | | 5/1980 | Washizuka et al. |
| 5,589,848 | A | | 12/1996 | Shimizu |
| 5,696,978 | A | * | 12/1997 | Nishikawa ................. 713/324 |
| 6,099,758 | A | | 8/2000 | Verrall et al. |
| 6,106,121 | A | * | 8/2000 | Buckley et al. ............. 359/839 |
| 6,311,077 | B1 | * | 10/2001 | Bien ........................... 455/566 |
| 6,611,249 | B1 | | 8/2003 | Evanicky et al. |
| 6,643,224 | B1 | | 11/2003 | Sekiguchi et al. |
| 2003/0151354 | A1 | | 8/2003 | Takizawa |
| 2004/0082367 | A1 | | 4/2004 | Nakanishi et al. |

FOREIGN PATENT DOCUMENTS

| EP | 0 884 622 | | 12/1998 |
| JP | 53-084598 | | 7/1978 |
| JP | 2000-196718 | | 7/2000 |
| JP | 2000352724 | A | 12/2000 |

* cited by examiner

*Primary Examiner* — Alexander Eisen
*Assistant Examiner* — Cory Almeida
(74) *Attorney, Agent, or Firm* — The Farrell Law Firm, P.C.

(57) ABSTRACT

Disclosed is an apparatus and method for embodying mirror function in a portable terminal by which a user can use an LCD of the portable terminal as a mirror, with a rear polarizer of the LCD constructed to allow the LCD to reflect incident light and to perform as a mirror when powered off, and to perform the original function of LCD when powered on. The LCD may further comprise a front polarizer for polarizing the external incident light to a certain direction, a liquid crystal for deflecting the incident light from the front polarizer about a molecular axis in the liquid crystal and arraying the light parallel to the direction of an electric field to pass the light along the molecular axis, and a rear polarizer for reflecting incident light from the liquid crystal when power is not applied and allowing the incident light to pass by the liquid crystal when power is applied.

2 Claims, 3 Drawing Sheets

APPARATUS AND METHOD FOR PERFORMING A MIRROR FUNCTION IN A PORTABLE TERMINAL

PRIORITY

This application is a Continuation of U.S. application Ser. No. 10/144,336, filed on May 13, 2002 now U.S. Pat. No. 7,151,515, which claims priority to an application entitled APPARATUS AND METHOD FOR EMBODYING MIRROR FUNCTION IN PORTABLE TERMINAL AND LIQUID CRYSTAL DISPLAY THEREFOR filed in the Korean Industrial Property Office on May 12, 2001 and assigned Serial No. 2001-26031, the contents of which are hereby incorporated by reference.

BACKGROUND OF THE INVENTION

1. Field of the Invention

The present invention relates to a display device of a portable terminal, and more particularly, to an apparatus and method for embodying a mirror function in a portable terminal which enables a Liquid Crystal Display (LCD) of the portable terminal to be used as a mirror, and the LCD therefor.

2. Description of the Related Art

In general, a portable terminal has been proposed to provide a voice conversation service and/or a personal information service as main functions. However, due to consumer demand and competition among providers, the portable terminal is required to provide various added functions.

An example of portable terminals with the added functions, which are manufactured for this purpose, has a mirror or reflector in the rear side of a flip or battery of the portable terminal. This allows a user to use the mirror attached to the portable terminal without carrying a mirror thereby affording convenience to the user.

However, the portable terminal fitted with the mirror or reflector has inconveniences of volume increase, design restriction and increase risk of breakage since typically only a common mirror or reflector is attached to one side of the portable terminal body. Therefore, an apparatus or method is required to remove the foregoing problems while taking advantages of the portable terminal having the mirror function.

SUMMARY OF THE INVENTION

Accordingly, the present invention has been proposed to solve the foregoing problems and it is an object of the present invention to provide an apparatus and method for embodying a mirror function of the LCD in the portable terminal.

In order to obtain the foregoing object, the present invention is characterized in that a thin flexible reflective polarizing film capable of obtaining luminance elevation while maintaining an angular field adopted in a rear polarizer of an LCD in a portable terminal to function as a mirror by reflecting an external light typically when the LCD is powered off. Power supply to the portable terminal is on/off controlled which typically also powers on/off the LCD. Alternatively, a function key is provided for powering on/off the LCD to allow a user to immediately operate the LCD as a mirror.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
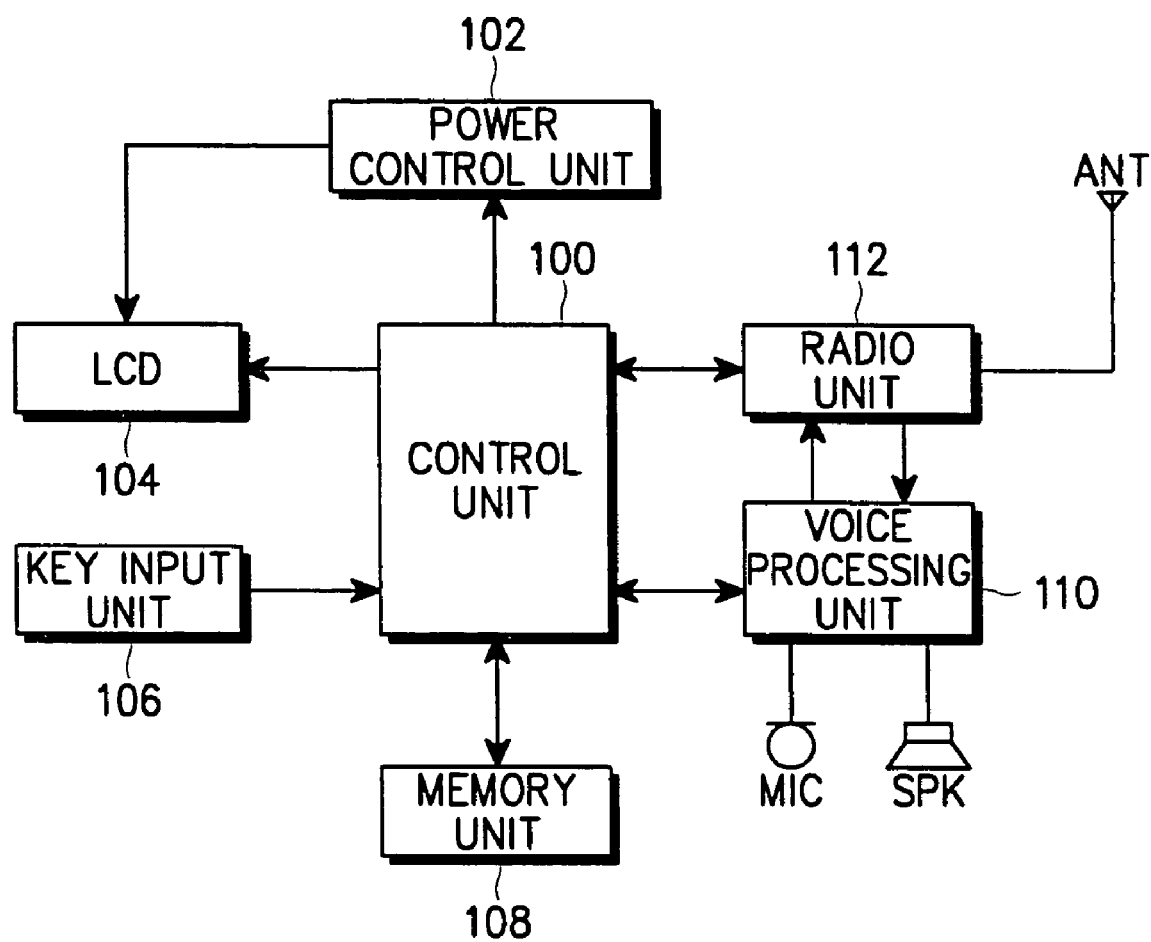
FIG. 1 shows a block diagram of a portable terminal according to the embodiment of the invention.

The following detailed description of a preferred embodiment of the invention will be made in reference to the accompanying drawings. In describing the invention, explanation about related functions or constructions which are known to the art will be omitted for the sake of clearness in understanding the concept of the invention. The following preferred embodiments of the present invention will be described with reference to the accompanying drawings. FIG. 1 is a block diagram of a portable terminal according to the embodiment of the invention, in which a radio unit 112 executes an operation for processing radio signals received from or transmitted to an external base station via an antenna ANT. For example, when an external call is received, the radio signal of call receipt is received through the radio unit 112, and then transferred to a control unit 100 to generate ring or execute several operations related to conversation.

A voice processing unit 110, under the control of a control unit 100, demodulates a coded voice signal from the radio unit 112, outputs an audible sound through a speaker SPK, and encodes an electrical voice signal from a microphone MIC to output an encoded signal to the radio unit 112.

A key input unit 106 has keys for setting and/or selecting various modes, such as a conversation complete key, number keys for dialing, as well as a selection key for powering the LCD on/off. It is recognized that the key to activate the LCD on/off function can be arbitrarily designated, additionally provided, or realized through combination of several keys having their own functions, all of which can be arranged to allow variation according to request of a user.

A memory unit 108 stores a program and initial service data for controlling general operations of the portable terminal. Memory unit 108 preferably has a volatile memory for temporarily storing various data according to the operations of the portable terminal.

The control unit 100 is generally provided as one-chip microprocessor for controlling the overall operations of the portable terminal and executing detection and processing of data transmitted/received to/from the radio unit 112. Further, the control unit receives key data from the key input unit 106 and executes pre-programmed operations and functions corresponding to the key data.

An LCD 104 operates as a display device of the portable terminal, and will typically display information including telephone numbers being dialed, various status information of the terminal and various information inputted by the user.

A power control unit 102 executes on/off operations of the LCD 104 under the control of the control unit 100.

Figure 2A:
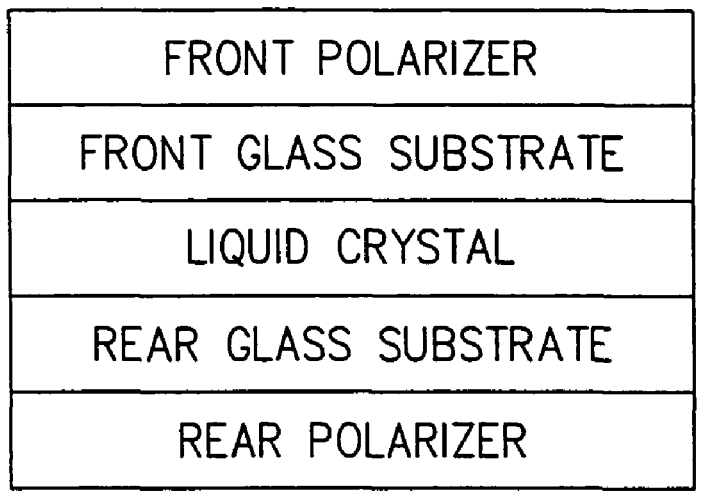
FIG. 2A schematically shows the structure of an LCD of the related art.
Figure 2B:
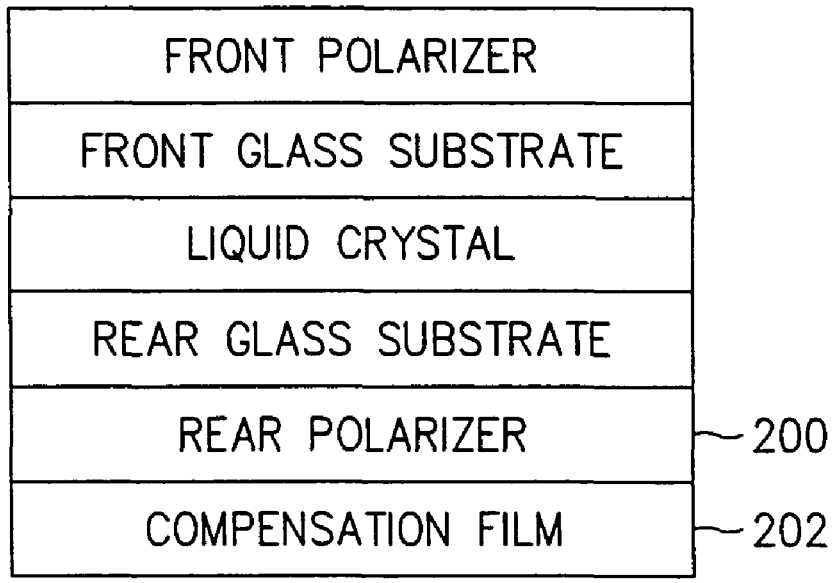
FIG. 2B schematically shows the structure of an LCD having a mirror function according to the embodiment of the invention.

FIG. 2A schematically shows the structure of an LCD of the related art, and FIG. 2B schematically shows the structure of the LCD according to the embodiment of the invention, which illustrates the structure of the LCD installed in the portable terminal for functioning as a mirror in response to user request.

Referring to FIGS. 2A and 2B, the LCD 104 is composed of several layers, and is simply illustrated as a structure including front and rear glass substrates, which are coated with transparent metal oxide films such as an Indium Tin Oxide (ITO) film having indium oxide as a main ingredient on the inner sides, a liquid crystal between the front and rear glass substrates and front/rear polarizers attached to the front and rear glass substrates. This structure will preferably also adopt a reflector to provide a liquid panel for displaying, and may further include a color filter which can be inserted between the liquid crystal and the structures including the front or rear glass substrates, or alternatively between the liquid crystal and either the front or rear polarizer.

The polarizers used in the LCD of the related art are attached to both sides of the liquid crystal cell with polarization axes being perpendicular or parallel to each other as necessary to adjust the intensity of an incident light according to the degree of rotation of the light which passes through the liquid crystal cell. Therefore, the light that passes through the front polarizer is distorted by the liquid crystal array that is varied under the influence of an external magnetic field created by an applied voltage. When the polarization axis of the rear polarizer matches the direction of polarization of the distorted incident light, the light passes through the rear polarizer and is brightly displayed on the LCD. On the other hand if the appropriate voltage is applied, the polarized light will be absorbed and will not pass through the rear polarizer and thus will be displayed as a dark region on the LCD. In other words, the perpendicular or parallel relation between the front/rear polarizers or the existence of voltage applied to the LCD determines whether and to what extent the light can pass through the polarizers. Selective application of voltage and the resultant dark and bright regions are the essence of the technique by which letters, numbers and other image are displayed. Meanwhile, the rear polarizer determines the appearance features of an LCD screen while providing a polarization function.

Based upon this principle, the LCD for embodying a mirror function according to the embodiment of the invention comprises a rear polarizer 200 made of a varied material, as shown in FIG. 2B, to reflect light incident on the LCD when voltage is not applied to the LCD. Light that is incident to liquid crystal cells to which voltage is applied will be polarized by the front polarizer and will not be reflected by the rear polarizer. These liquid crystal cells appear as a dark portion (or portions) on the LCD display, as typical for display of information such as a character or a picture. In contrast, light that is incident to liquid crystal cells to which voltage is applied will not be polarized by the front polarizer, will be reflected by the rear polarizer, will pass through the front polarizer, and will appear as a bright portion on the LCD display. A reflective polarizing film used in the embodiment of the present invention is a Dual Brightness Enhancement Film (DBEF), manufactured by the 3M company.

While the front/rear polarizers have been described as intersecting each other in a perpendicular or parallel angle, the twisted nematic (TN) type LCD is a preferred embodiment. In the following detailed description, the upper and lower arrays of molecules constituting the LCD are described as having a twist angle of 90° and it should be understood that the following description is only an embodiment for assisting explanation and the angle between the front/rear polarizers and thus the transmissivity of the LCD will vary according to the total twist angle of the molecular arrays in the liquid crystal.

The liquid crystal according to an embodiment of the invention deflects the incident light about a molecular axis arranged in the liquid crystal. When voltage (i.e. power) is applied to the LCD, the molecular axis of the liquid crystal is aligned parallel to an electric field so that the polarized light through the front polarizer does not change the polarization status in the liquid crystal cell. On the other hand, when voltage is not applied to the LCD, the polarized light through the front polarizer is deflected about the molecular axis of the liquid crystal to be incident on the rear polarizer. The rear polarizer 200 of the invention, as shown in FIG. 2B, adopts a thin and flexible reflective polarizing film which will provide an elevated level of luminance while maintaining the angular field so as to reflect essentially all incident light polarized in a certain direction, i.e. a direction perpendicular to the polarization axis of the rear polarizer 200 and without absorption thereof. Moreover, it will be appreciated that the rear polarizer 200 and compensation film 202 can be obtained as a color polarizer or have a metallic appearance or silver color as necessary for use as a mirror. According to a preferred embodiment of the invention, the rear polarizer 200 is manufactured so that the incident light to the rear polarizer 200 will be reflected when the LCD is powered off.

The rear polarizer 200 according to the preferred embodiment of the invention adopts the reflective polarizing film so that a bright portion and a dark portion are represented on the LCD display when voltage (i.e. power) is applied to the liquid crystal cells of the LCD. Here, the bright portion allows the polarized light to pass through as a background, and the dark portion prevents the polarized light from passing through by absorbing the same, the cumulative effect being to display letters, numbers or other images on the LCD screen. In other words, the portion that was relatively darker than the background for displaying the letters is displayed bright on the LCD through the passage of the polarized light, and the background is displayed on the LCD with a color of the rear reflector, according to the reflection of the polarized light. Therefore, the embodiment of the invention can have a problem that definition thereof may be reduced as compared to the related art, and the compensation film 202 shown in FIG. 2B will compensate for lowered definition or dimness. The compensation film 202 compensates for dimness of the displayed portion commonly caused by the rear reflector 200 when voltage is selectively applied to display letters, numbers or images, and has the effect of making more clear the letters, numbers or images displayed on the LCD.

Figure 3:
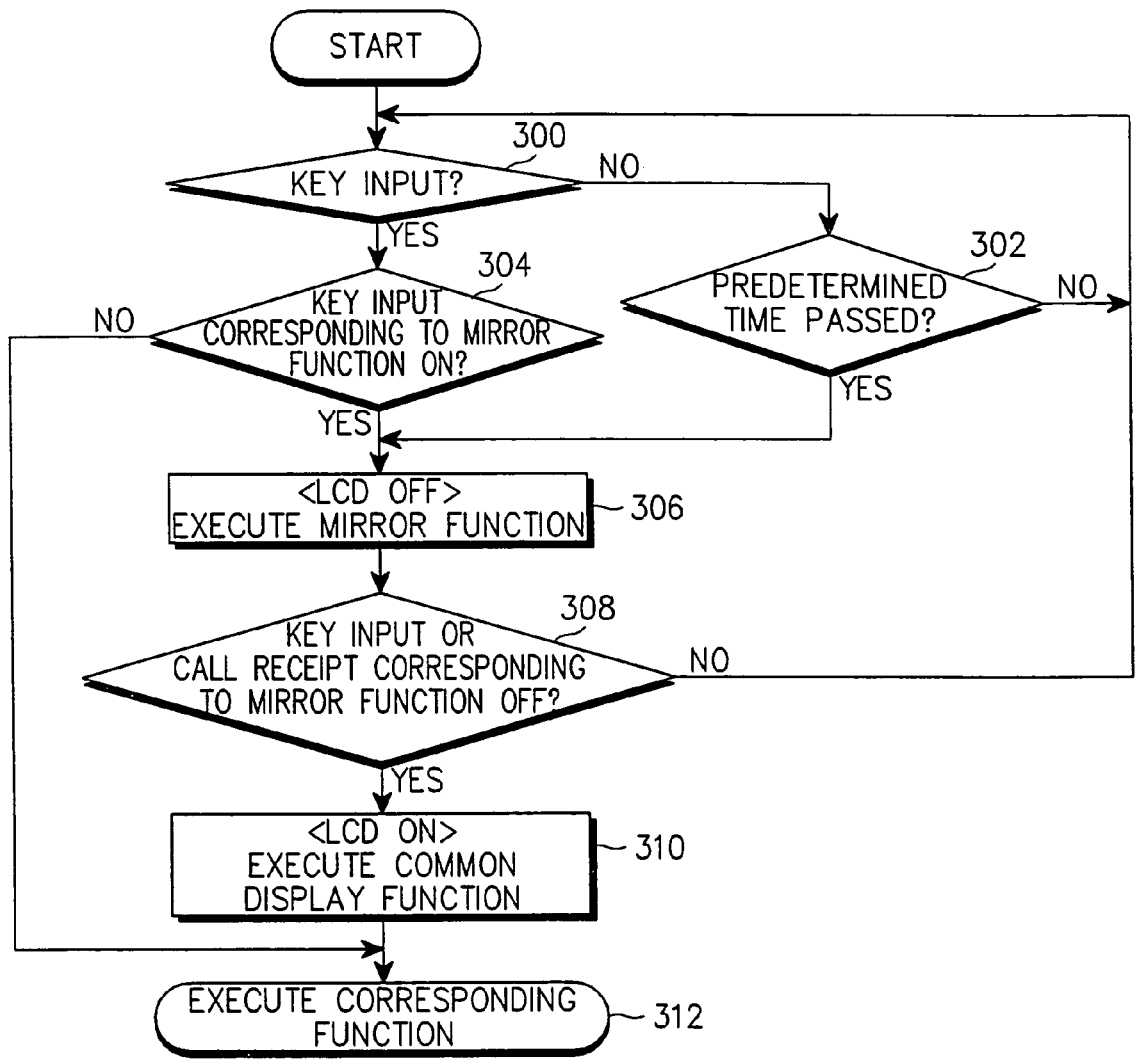
FIG. 3 is a flow chart of the mirror function according to the embodiment of the invention.

FIG. 3 is a flow chart of the mirror function according to the embodiment of the invention in which the LCD is fitted with the rear polarizer 200 and can function as the mirror according to the request of the user.

In the apparatus and method for embodying the mirror function of the portable terminal according to the preferred embodiment of the invention, the LCD for embodying mirror function is characterized in functioning as a mirror when power is not applied and as a common display device when power is applied. Hereinafter detailed description will be made about the preferred embodiment of the invention in reference to FIG. 1, FIG. 2B and FIG. 3. In step 300, the control unit 100 is typically in standby mode pending determination that a key input is performed. In this case, key input means that any kind of key is inputted from any of the keys or input devices of the portable terminal, and thus step 300 is an operation for determining whether the user is using the portable terminal. If it is determined that there is no key input, the control unit 100 counts a predetermined period of time, in step 302. In other words, it is determined whether a key input has taken place within the predetermined period of time. If it is determined that the predetermined period of time has elapsed in step 302, the power control unit 102 will power off the LCD 104 in step 306. In other words, all information displayed in the LCD 104 will disappear, as the LCD 104 is not being supplied with power. The function of setting the predetermined period of time is preferably provided by a menu of the portable terminal to allow the user to readily select and set the function.

Therefore, when the portable terminal is not used for at least the predetermined period of time, the preferred embodiment will stop providing voltage to the LCD 104, saving power and using the mirror function.

Meanwhile, if it is determined that key input has taken place in step 300, the control unit 100 executes step 304 to determine if the key input request corresponds to a mirror function. If the key input request corresponds to the command of mirror function on, the control unit 100 will instruct the power control unit 102 to turn off the LCD 104 at step 306. If not, the corresponding function of the key that was input is executed at step 312.

The rear polarizer 200 of a preferred embodiment of the invention, as shown in FIG. 2B, adopts a thin and flexible reflective polarizing film which can obtain luminance elevation while maintaining the angular field so as to reflect essentially all incident light polarized in a certain direction, i.e. a direction perpendicular to the polarization axis of the rear polarizer 200 without absorption thereof. A material for such total reflection can be obtained as a color polarizer or have a metallic appearance or silver color so that the LCD 104 can be used as a mirror when the LCD is powered off.

When powered off, the LCD of the related art deflects incident light that was polarized through the front polarizer about the molecular axis so that the incident light may pass through the rear polarizer. Whereas, the LCD according to the embodiment of the invention has front and rear polarizers with polarization axis parallel to each other so that a light incident to the rear polarizer 200 is totally reflected when the LCD is powered off in step 306 as shown in FIG. 3.

Then, the control unit 100 executes step 308, and when a key input is performed or another call is received, corresponding to a mirror function off condition, LCD 104 is supplied with voltage so that the common display function can be performed at step 310. Key input corresponding to such mirror function off may be designated as one key, for example the 'Clear' or 'Send' key, that may need to be pressed relatively longer than by a common key input.

The LCD for embodying mirror function according to the invention comprises the front polarizer for polarizing the external incident light in a certain direction; the liquid crystal for deflecting the incident light from the front polarizer about the arrayed molecular axis when power is not applied, and arraying the molecular axis parallel to the direction of the electric field to deflect the light along the molecular axis when power is applied; and the rear polarizer for reflecting a greater amount of incident light from the liquid crystal when power is not applied, and absorbing the incident light from the liquid crystal when power is applied.

The apparatus for embodying mirror function in the portable terminal according to the invention comprises the LCD having at least the rear polarizer made of a material for reflecting incident light when power is not applied; the key input unit for detecting key input corresponding to mirror function on/off by the user and transferring the signal corresponding to key input to the control unit; the power control unit for turning on/off or controlling power applied to the LCD under the control of the control unit if key input is not performed for the predetermined time period; and the control unit for controlling the power control unit in response to the key input signal corresponding to mirror function on/off by the user to power on/off the LCD, counting the time period where key input is not performed to control the power control unit for powering on/off the LCD when the predetermined time period passes, and controlling the LCD to perform the display function when the LCD is powered on.

The method for embodying mirror function in the portable terminal according to the invention, the portable terminal including at least the LCD for operating as a mirror when power is not applied and as a common display unit when power is applied, by determining if there is key input from the user while the LCD performs the common display function; if there is key input, determining if key input corresponds to mirror function on; if key input corresponds to mirror function on, powering off the LCD to perform as a mirror; determining if there is key input from the user corresponding to a mirror function off condition or a call receipt when the LCD operates as a mirror; and if key input or call receipt is performed, powering on the LCD, whereby the LCD returns to a common display function to perform a common display function.

Additionally, the method further comprises the step of counting the time period where key input is not performed, and if the time period exceeds the predetermined time period, powering off the LCD to execute a mirror function.

Further, the portable terminal in which the apparatus and method embodies the mirror function according to the invention comprises at least the LCD, which performs as a mirror when the portable terminal is powered off.

While the present invention has been described with reference to certain preferred embodiments, it will be understood by those skilled in the art that various changes and modification can be made without departing from the spirit and scope of the invention as defined by the appended claims and the equivalents thereof.

What is claimed is:

1. A method for performing a mirror function in a portable terminal which includes a Liquid Crystal Display (LCD), comprising the steps of:
   determining if there is a key input from a user while the LCD performs a common display function;
   if there is a key input, determining if the key input corresponds to a mirror function on;
   if the key input corresponds to the mirror function on, powering off the LCD;
   determining if there is a key input or call receipt from the user corresponding to a mirror function off condition while the LCD performs as a mirror; and
   if the key input or call receipt is performed, powering on the LCD, whereby the LCD returns to said common display function,
   wherein the LCD operates as a mirror when no power is applied to the LCD, and as a common display unit when power is applied to the LCD.

2. The method of claim 1, comprising the step of turning off the power to the LCD if it is determined that the key input has not been performed for a predetermined time period.

* * * * *